United States Patent
Blood

[19]

[11] Patent Number: 6,079,542
[45] Date of Patent: Jun. 27, 2000

[54] OBJECT SORTER AND SIZER

[75] Inventor: Roger Blood, Linden, Va.

[73] Assignee: Agri-Tech, Inc., Woodstock, Va.

[21] Appl. No.: 09/027,489

[22] Filed: Feb. 20, 1998

[51] Int. Cl.[7] .................................................. B65G 17/32
[52] U.S. Cl. ...................... 198/384; 198/385; 198/370.05
[58] Field of Search ................................... 198/384, 385, 198/370.04, 370.05

[56] References Cited

U.S. PATENT DOCUMENTS

| | | | |
|---|---|---|---|
| 2,909,270 | 10/1959 | Hait ......................................... | 198/384 |
| 2,980,233 | 4/1961 | Pucinelli ................................. | 198/384 |
| 3,865,266 | 2/1975 | Scata ...................................... | 198/370.04 |
| 4,198,758 | 4/1980 | Eineichner et al. ................. | 198/370.04 |
| 4,353,455 | 10/1982 | Mumma et al. ........................ | 198/384 |
| 4,482,061 | 11/1984 | Leverett ................................ | 209/592 |
| 4,569,434 | 2/1986 | Horii et al. .......................... | 198/370.04 |
| 4,787,498 | 11/1988 | Males et al. .......................... | 198/370.04 |
| 4,830,195 | 5/1989 | De Greef ............................... | 209/646 |
| 4,981,205 | 1/1991 | Cowlin ................................... | 198/384 |
| 5,197,585 | 3/1993 | Blood ..................................... | 198/534 |
| 5,294,004 | 3/1994 | Leverett ................................ | 198/384 |
| 5,477,955 | 12/1995 | Madden et al. ...................... | 198/370.04 |
| 5,611,419 | 3/1997 | La Vars ................................ | 198/370.04 |
| 5,677,516 | 10/1997 | Leverett .............................. | 198/370.04 |

*Primary Examiner*—Christopher P. Ellis
*Assistant Examiner*—Joe Dillon, Jr.
*Attorney, Agent, or Firm*—Foley & Lardner

[57] ABSTRACT

An object sorting system includes a product presentation device with a floating portion and a subframe pivotally connected to a frame link driven by a chain. The product presentation device and frame link operate with a latch so that the product presentation device can move objects through the system to be sorted and deposit the objects at an appropriate job station. The floating portion of the product presentation device allows accurate determination of object weights. The product presentation device can also be married to or divorced from wheels which are used to turn the object before a viewer for sorting based on visual characteristics. Because the wheels can be divorced from the product presentation device, objects can be deposited more gently in collection bins at the drop stations. The system may use belt driven or roller driven pre-singulation to assure that only one object is placed in a product presentation device. The system has independently driven chain drives for the wheels and the product presentation devices. Chain phasing is employed on either the chain drive for the wheels or the product presentation device to maintain appropriate spacing between the wheels and the product presentation device, thereby reducing wear and tear on the system and its components.

52 Claims, 13 Drawing Sheets

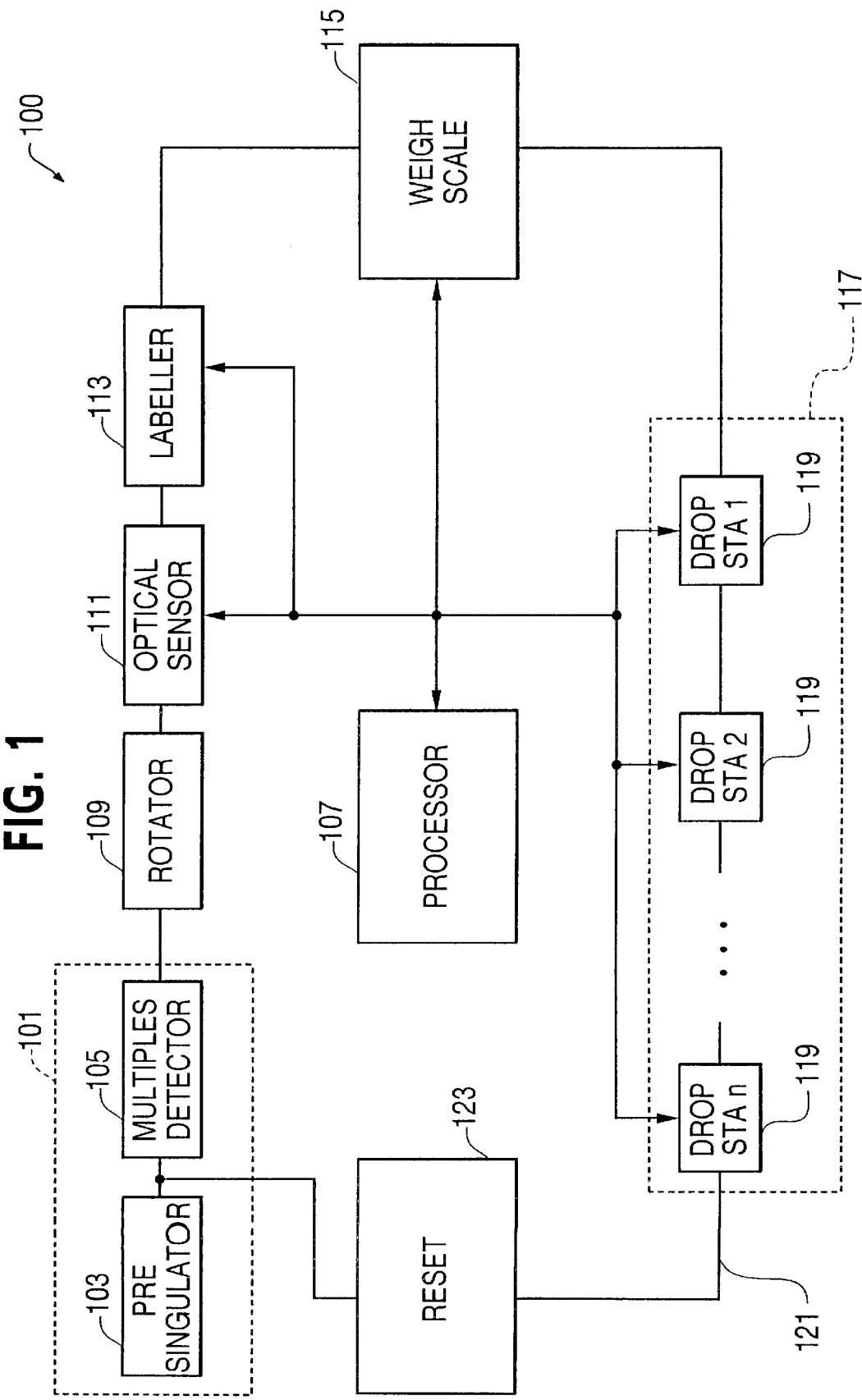

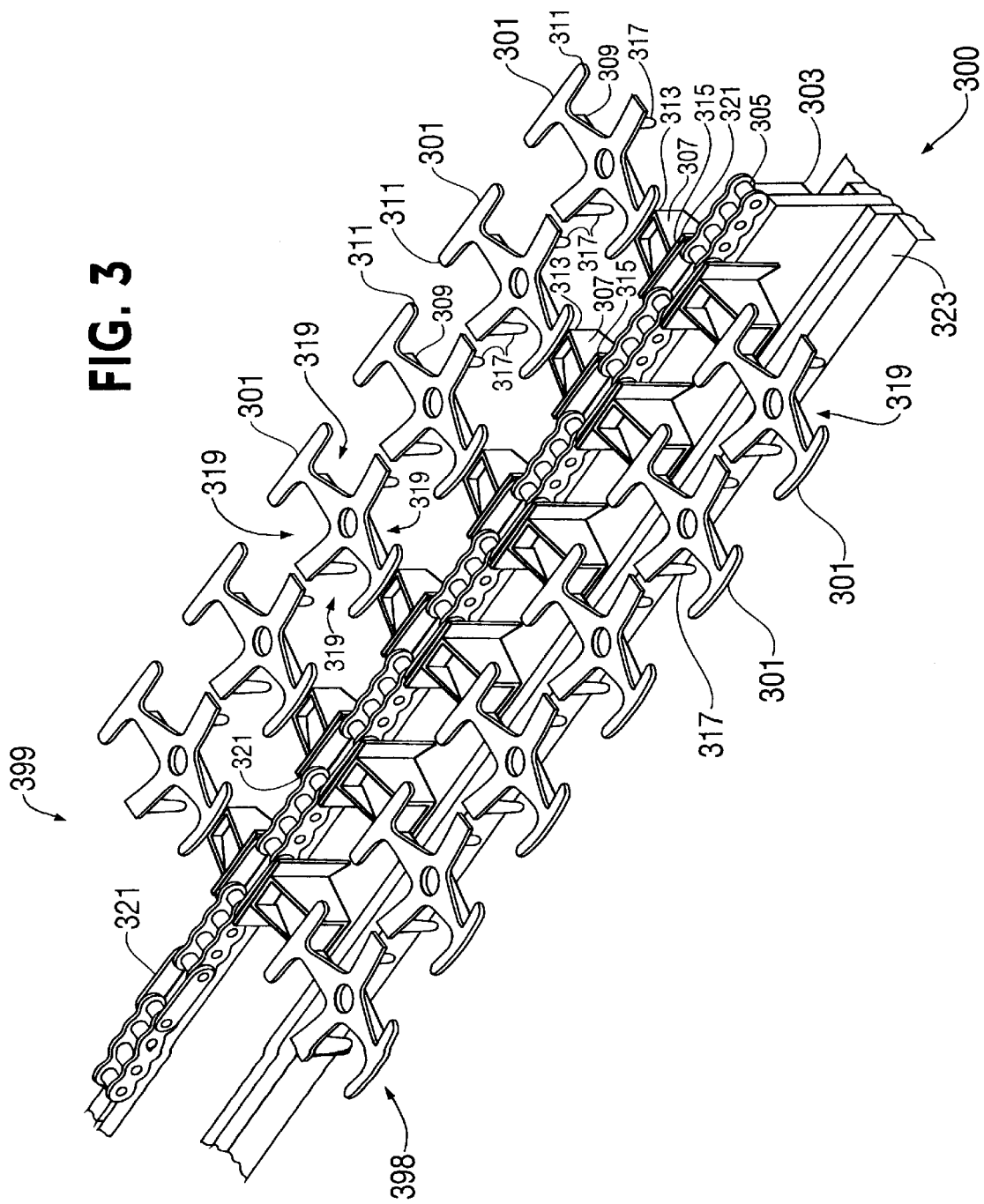

OBJECT SORTER AND SIZER

BACKGROUND OF THE INVENTION

1. Field of the Invention

The invention relates to apparatus and methods for sorting objects such as fruits, by categories, such as size, shape, weight and color.

2. Related Art

Object sorting apparatus, in particular fruit sorters, typically have an intake area which receives quantities of fruit. In order to sort the fruit by quality or grade, for example, by size, color, or other characteristics, it is necessary to singulate the fruit so that individual pieces can be inspected. Upon inspection, each piece of fruit can be graded according to size, weight, color, or other desired parameter, and then transferred to a conveyor so that the fruit can be deposited in appropriate collecting bins. One such system is disclosed in U.S. Pat. No. 5,197,585 to Blood. Blood discloses an object sorter having a singulation system with a first object conveyor having independently rotating wheels pivotally attached to and transporting a proximate portion of the object holder through the singulation section of the apparatus. The object holder has a distal end positioned between a first pair of wheels and a cup shaped portion between the distal and proximate ends. The wheels are located a lateral distance across from each other so that objects placed in the singulation section contact the wheels without dropping into the object holder. A first independently adjustable speed belt contacts the first object conveyor wheels to rotate the wheels at a substantially constant speed in the singulation section. This causes singulation of the objects contacting the wheels.

Blood also illustrates a preferred configuration which employs separate belts for each row of wheels. By using separate belts for each row of wheels, it is possible to run the belts at either the same speed to achieve rotation or at different speeds to rotate the objects, such as fruit, about different axes simultaneously.

Blood also discloses a sorting section having wheels receiving objects from the singulation section. The sorting section determines a measurement parameter for each object received and sorts the objects according to the measurement parameter. A second independently adjustable speed belt contacts the wheels in the sorting section to drive them at a rate to cause a complete, progressive rotation of each fruit item contacting the wheels as it passes through the sorting section. Blood notes that it is possible to employ separate belts for each row of wheels to obtain rotation of the fruit about more than one axis in the sorter section also.

The object holder disclosed by Blood in U.S. Pat. No. 5,197,585 facilitates color sorting, but is not adapted to measuring weight. Objects to be weighed are transferred to a separate carrier. Thus, there is a need for a single carrier that can be used for sorting by weight and color. Moreover, modern systems demand faster operation.

SUMMARY OF THE INVENTION

It is an object of the invention to provide a more efficient system and method for sorting and sizing objects according to desired parameters.

A product presentation device (PPD) according to the invention has a subframe and a floating member. The floating member moves vertically independent of the subframes. In this way, in a method according to the invention a subframe of a PPD can be conveyed through a system, while the floating member floats up and down independently to permit accurate weighing of its contents. A PPD according to the invention also has a gull wing shape to permit wheels or other secondary carriers to be married to or divorced from the PPD at any point in a system as desired. Such wheels can be controlled to rotate the object in the PPD for viewing from various perspectives. Thus, a method according to the invention includes marrying and divorcing a secondary carrier with a primary carrier at desired points in the system. The system achieves stability by a parallelogram arrangement of wheel chain drives and axles and a chain phasing device which maintains desired spacing between wheels and a PPD. A PPD according to the invention also has a relatively long pivot aim to facilitate soft deposit of sorted objects into collection bins at drop stations. A PPD according to the invention also operates with a fault tolerant drop gate which will not damage itself or other components if a solenoid controlling the drop gate fails.

A pre-singulator according to the invention uses belts or frictional effects of rollers to line objects one behind the other for sorting purposes.

These and other objects of the invention are accomplished by apparatus and methods employing such apparatus described herein with reference to the drawings.

BRIEF DESCRIPTION OF THE DRAWINGS

FIG. 1 is a block diagram illustrating a portion of a singulator/sizer according to the invention.

FIG. 3 illustrates a product presentation device (PPD) as installed in a system according to the invention in a position where wheels are divorced from the PPD.

DETAILED DESCRIPTION OF THE PREFERRED EMBODIMENTS

Figure 2A:
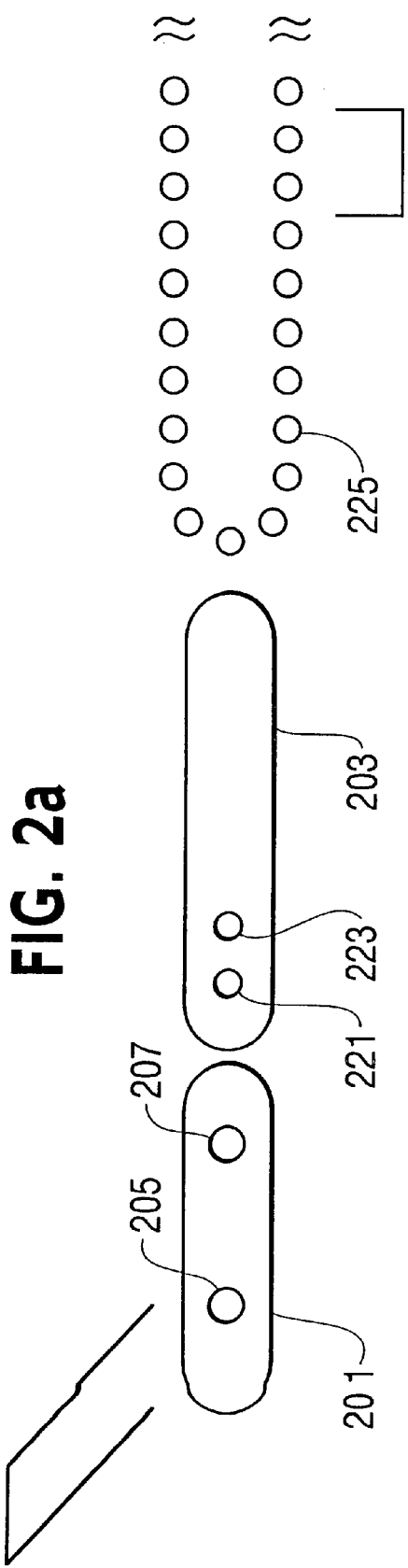
FIG. 2a illustrates a pre-singulator using belts according to the invention.

FIG. 1 illustrates a sizer/sorter system 100. The sizer/sorter system 100 is generally configured as an endless conveyor, although other arrangements are possible. The system includes a singulation section 101. In singulation section 101, a pre-singulator 103 lines individual items one by one for transition into a singulator and eventual deposit and pick up by one of a plurality of carriers which transports an item to be sorted through the system. Although singulators are known in the art, a unique pre-singulator according to the invention is disclosed herein. In addition, a unique carrier according to the invention, identified herein as a product presentation device (PPD) is disclosed. Typically, singulation section 101 will also include multiple item detection 105 which detects the presence of more than one item in a carrier. Such devices, which are conventional, provide a gap at the end of the singulator to divert excess numbers of objects lined up for pick up by a carrier into a recirculation path.

System 100 may also include a rotator 109 to rotate the object so that different sides thereof may be presented for viewing by a camera or other optical sensor 111. Information from optical sensor 111 is transmitted to processor 107 to be used for sorting by color, blemish content or other parameter.

The system may also include a labeler 113. As shown in FIG. 1, labeler 113 is positioned to label individual items based on optical parameters, such as color. Those of ordinary skill will recognize that labeler 113 could be located elsewhere in the system to label items as desired or that multiple labellers could be used. A labeler may operate independently or be responsive to the processor 107 to attach an appropriate label to the item at any point in the system 100.

A carrier such as a PPD next moves an object to weigh scale 115, which weighs the object. Conventional weigh scales may be used. Alternatively, a multipoint weigh scale, such as the four point weigh scale disclosed herein, which takes multiple weight samples for processing by itself or by processor 107 may be employed.

The carrier next delivers the objects to sorting section 117, where a plurality of drop stations 119 exist. For example, a 200 foot long sorting section 119 could have drop stations spaced 30 inches apart. In response to a command from the processor, which tracks the carriers according to desired parameters, such as color, weight, or size, a solenoid is triggered at one of the drop stations, causing the carrier to deposit its contents into a collection bin. At the end 121 of sorting section 117, all the carriers are typically empty. As discussed further herein, the PPD according to the invention, provides advantages in dropping items into the collection bins without undue damage.

Carriers are then cycled through reset section 123, where they are returned to a position in which the carriers can accept more product from singulator 103, so that the sorting process can be executed on a new item.

Items to be sorted enter system 100 at singulation section 101 randomly from a source of product supply such as a chute. In the preferred embodiment, singulation section 101 has a pre-singulator 103 and a detector 105 which recognizes when multiple items are placed in a carrier.

In singulation section 101 objects are arranged to be deposited into carriers, such as a product presentation devices (PPD) on a conveyor such that one object is placed in each PPD. Individual objects or pieces of the product, such as fruit, enter a plurality of channels or lanes. The invention will be described for a single lane in context of sorting fruit. Those of ordinary skill will recognize that multiple lanes can be arranged in parallel and powered from the same source and that items other than fruit can be sorted.

One feature according to the invention is the incorporation of a pre-singulator. A sorting system operates most efficiently when all its object carriers, such as the PPD disclosed herein, are filled with objects to be sorted. Thus, one objective of an efficient system is avoiding empty carriers. A competing consideration is the need to singulate objects, such that only one object is placed in a carrier. High operating speeds compound the difficulties of singulating product while occupying each and every carrier for efficient operation.

Figure 2B:
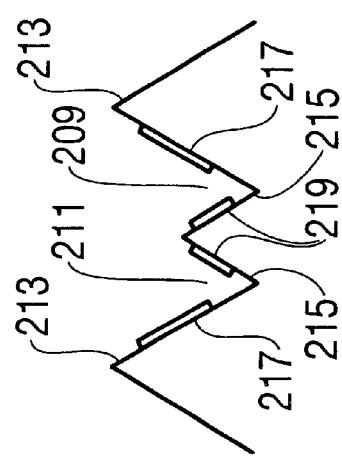
FIG. 2b is another view of a pre-singulator using belts according to the invention.

As shown in FIG. 2a, objects are typically delivered from a chute to a flat belt 201 which moves the objects to be sorted, such as fruit, toward pre-singulator 203. Flat belt 201 is driven by rollers 205 and 207 at a predetermined rate. As shown in FIG. 2b, in the pre-singulator individual pieces of the fruit enter generally V-shaped individual lanes 209 and 211 defined by inwardly sloping walls, 213 and 215. FIG. 2b illustrates a two lane pre-singulator, but any number of such lanes can be formed to accommodate the number of sorting lanes of the machine. The fruit is driven forward by belts 217 and 219. As shown in FIG. 2b, belts 217 are wider than belts 219, although the same size belts could be used. Preferably, belts 217 are driven by a first roller 221", and belts 219 are driven by a second roller 223. Separate rollers 221 and 223 allow the belts to be driven at different speeds if desired to facilitate rotation and singulation of the fruit. It is also possible to drive the belts at the same speed.

When the fruit enters the belts, it moves down the V-shaped channel, gradually lining up one piece behind the other, as a result of the action of the belts transporting the fruit. At the end of the pre-singulation section the fruit is transitioned to the singulation section, where it is placed between wheels travelling along the length of the singulation section.

Upon entering a lane in the singulation section, the fruit is moved forward by a transport mechanism or secondary carrier such as wheels 225. The fruit makes contact with wheels 225, which are driven by a conveyor such as a chain drive. As previously discussed herein, in a conventional manner the wheels themselves may be turned by a pair of belts driven to move at the same or different speeds and contacting the wheels from below. The turning of the wheels causes the fruit to rotate, such that as the fruit travels forward through the channel, individual pieces of fruit line up one behind the other while being carried on the wheels 225. At the end of the singulation section, each piece of singulated fruit is then picked up by one carrier, such as a product presentation device or PPD according to the invention, for further processing. Occasionally, more than one piece of fruit lines up to be picked up by a carrier. In this case some of the fruit falls through gap 227 to be recirculated into the system.

Figure 2C:
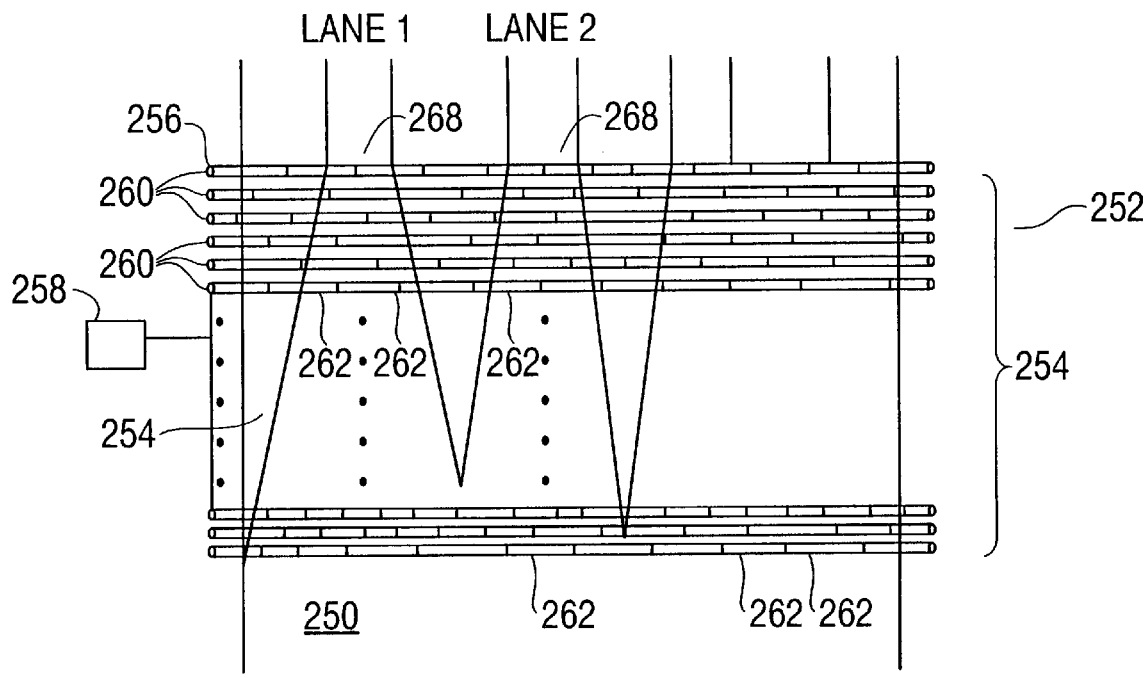
FIG. 2c illustrates a pre-singulator/accumulator using rollers according to the invention.
Figure 2D:
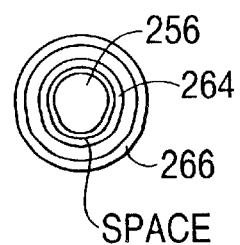
FIG. 2d illustrates rollers used in the pre-singulator of FIG. 2c.

An alternative pre-singulator according to the invention is shown in FIGS. 2c and 2d. Flat belt 250 delivers fruit randomly to pre-singulator 252, which is shown in FIG. 2c having four lanes, by way of illustration only. Of course, any number of such lanes could be formed. Pre-singulator 252 has a section 254 with a plurality of rods 256 spaced to prevent fruit from falling between them. The rods are driven to rotate in the direction of travel of the fruit, hereinafter the forward direction, by a single drive mechanism 258. Each rod has an idler 260 to prevent the rod from stopping when encountering the weight of fruit deposited on top of the rod. Mounted across each of the rods is a plurality of tubes 262. Tubes 262 on each rod are spaced at an interval across the width of the lane that is different from the interval for the tubes of an adjacent one of the rods. Preferably, tubes 262 are formed of inner tube and outer tube 266.

Pre-singulator 252 operates based on the frictional characteristics of the tubes mounted on the rods. As fruit makes contact with the outer tube 266, it transfer its weight, thereby causing rotation of the outer tube, which advances the fruit. As the fruit advances, it is channeled by plow members 268 toward the lanes, with the rods 256 positioned in the floor of the channel to rotate in the forward direction of travel of the fruit. As the fruit passes over the rotating rods through the length of singulation section from the proximate end to the distal end of the singulation section, the pieces of fruit line up one behind the other. Fruit thus accumulates in the channels for efficient delivery to the singulator. When the fruit reaches the end of the pre-singulation section 252 it is transferred to the singulator or it may be directly picked up by the carrier, such as the PPD disclosed herein.

As noted, fruit may accumulate in the channel. The forward motion of the fruit toward the distal end 268 of the pre-singulation section results in moving the pieces of fruit forward and out of the pre-singulation section 252. Since the fruit accumulates, there is always a piece of fruit ready at each channel to be loaded into the next portion of the system. System efficiency is improved because each and every carrier is more likely to have fruit available to be loaded therein. The fruit then advances in the system for further processing. Further processing may include, for instance, evaluation of the fruit's color or weight so that the fruit can be sorted in accordance with these or other parameters.

The invention includes a unique product carrier, identified herein as a production presentation device, PPD, to facilitate such analysis and sorting. One feature of the PPD according to the invention is that wheels can be married to and divorced from the PPD at various stages to allow the system according to the invention to accomplish different functions. For example, when married to the PPD, the wheels protrude through the PPD to contact the fruit. The wheels can be turned by belts, which causes the fruit to rotate while remaining within the PPD. In this way, different sides of the fruit can be viewed by a camera which provides data for sorting by color or blemish content. At other times, the wheels can be divorced from the PPD, so that there is no contact between the wheels and the fruit which rests within the PPD. This arrangement is useful in weighing operations, as discussed further herein. Thus, wheels can be married to or divorced from the PPDs at various positions in the system to perform desired functions.

FIG. 3 illustrates a single lane portion of a sizer system at a location where the wheels are divorced from the product presentation device. The portion 300 of the system shown has a plurality of PPDs 301 which are driven along frame 303 using chain 305. Lengths of chain 305 are connected to frame link 307. Frame link 307 provides the connection to PPD 301. Thus, as chain 305 moves through the system it pulls frame link 307, thereby moving the PPD 301 forward. Although chain drives are disclosed, other suitable drives, such as belts or other linkages, may be used throughout in place of such chains to cause PPDs, wheels and other elements to be transported through the system.

PPD 301 has a subframe or base section 309 and an upper or floating section 311. Subframe 309 is pivotally attached to frame link 307 at pivot pin 313. Latching mechanism 315 holds the subframe in the upright position, thereby supporting the floating member and the object to be sorted therein. At an appropriate location, based on the sorting parameters, latching mechanism 315 is activated to cause subframe 309 to pivot on pin 313, thereby allowing the contents of floating member 311 to be placed into a collecting bin or receptacle.

Floating portion 311 of PPD 301 has downward pointing projections 317. Projections 317 protrude through spaces in subframe 309 and rest on the floor of the channel or a weigh scale, as described further herein. The positions of projections 317 and the corresponding spaces or holes in the subframe 309 are keyed to preclude incorrect insertion of floating member 311 into subframe 309.

As previously discussed herein, it is useful in some circumstances to rotate the fruit being sorted so that it can be viewed from various sides. This is typically accomplished by allowing wheels to contact the fruit, causing the fruit to turn as a result of the motion of the wheels. Conventional systems must perform this function prior to depositing the fruit into a carrier such as a weigh cup. However, the shape of PPD 301 according to the invention eliminates this difficulty. As illustrated in FIG. 3, PPD has a shape resembling a gull wing, resulting in open spaces 319 between various arms of the PPD. When the PPD is in a location in the system such as that shown in FIG. 3 where wheels are divorced from the PPD, the fruit being sorted rests on the top surface of floating section 311.

Figure 4A:
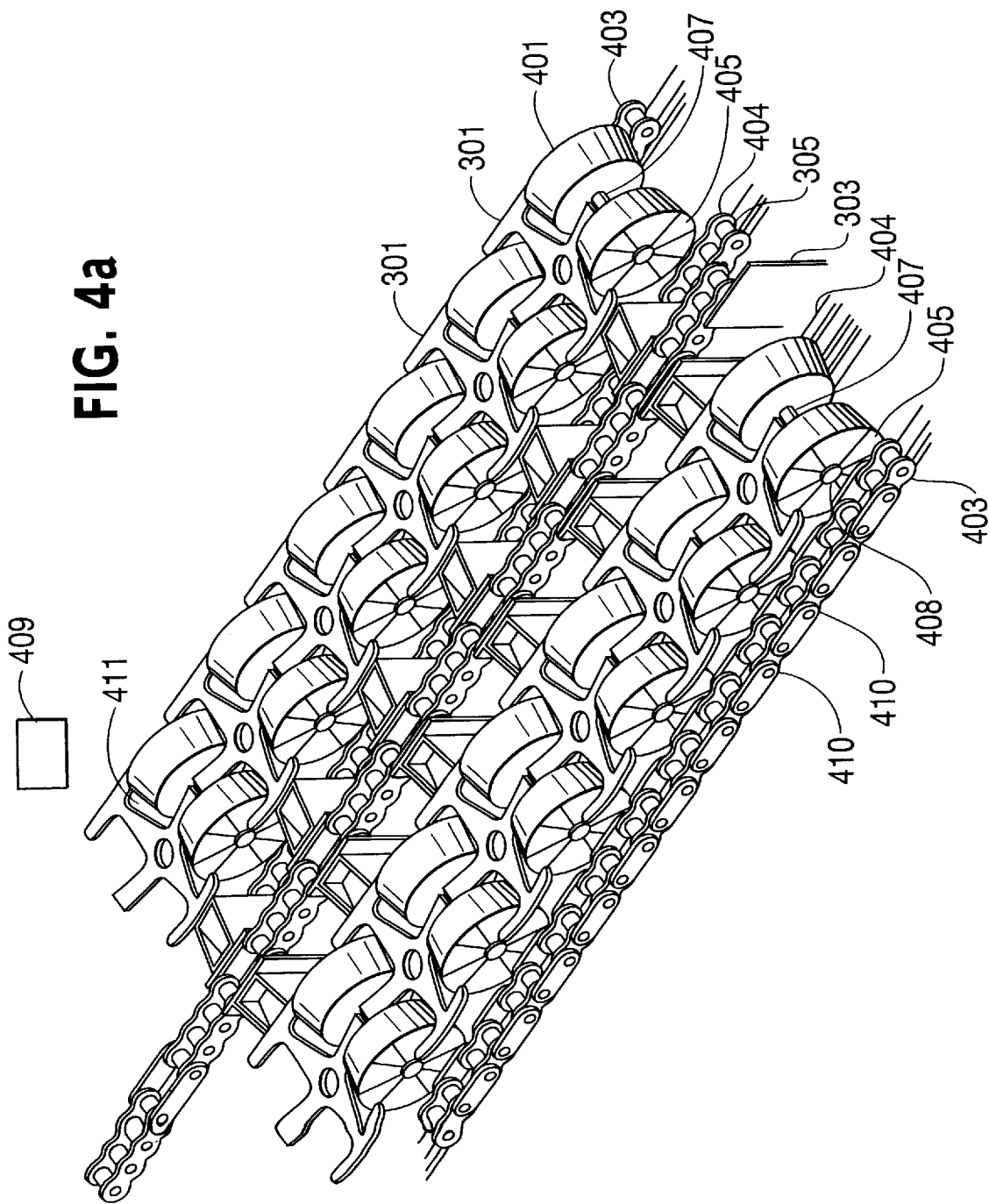
FIG. 4a represents a PPD according to the invention at a location in the system where the wheels are married with the PPD.

FIG. 4a illustrates a portion of system 100 where PPD 301 is married to wheels 401. It should be noted that wheels 401 may be previously described wheels 225 delivering singulated fruit for pickup by PPD 301 or may be other wheels at some other point in the system. In the case of wheels delivering singulated fruit, the wheels marry up with the PPD as the singulated fruit is picked up by the PPD, so that the wheels can be used, for example to rotate the fruit in the PPD to present different sides for viewing by a camera or other device. The wheels 401 are married to the PPD 301 simply by allowing the wheels to be placed into the openings 319 formed by the arms of PPD. Wheels 401 are connected to a separate chain drive 403 through wheel transport 405 and rotate on axles 407. For example, the wheels may be driven by the chain drive which drives the wheels in the singulation section. Wheels 401 are pulled forward by the chain drive 403 through wheel transport link 405. The axles 407 attach to wheel transport link 405 at wheel/axle attachment point 408. Wheel transport link 405 attaches to chain drives 403 and 404, for example, through tabs 410.

As the wheels protrude through openings 319, they contact the fruit. Typically, the wheels protrude far enough to lift the fruit off the surface of floating member 311. The wheels can be caused to turn at a desired rate by contacting the wheels from below with belts, in a conventional manner, as previously discussed herein.

An advantage of the PPD according to the invention is that it allows wheels to be placed into the spaces 319 at any desired point in the system. Thus, for example, wheels 401 can be married to PPD 301 at the beginning of the system after singulation in order to rotate the fruit for color sorting. Chain drive 403 moving wheels 401 forward can then return while chain drive 305 continues to advance PPDs 301 forward in the system. As the wheels return and begin to recirculate, they become divorced from the PPD 301. Processing without the wheels, for example, weight processing, as discussed further herein, can then take place. If necessary, wheels can again be married to the PPD 301 at a later point in the system. The use of a separate chain drives facilitates the introduction and removal of the wheels as desired for the system configuration. The PPD 301 according to the invention provides the unique advantage that it is not necessary to remove fruit from the PPD in order to turn the fruit to display various view to a viewing device. It should be noted that other carriers can be used in place of wheels and that openings to receive such carrier devices may be incorporated into other areas of a PPD. For example, a system according to the invention could include a flat member which rises through openings in a more central area of the PPD to lift an object for inspection.

The configurations in FIGS. 3 and 4a also have the advantage that a single PPD transport chain drive 305 provides the drive mechanism for two lanes of fruit 399 and 398 due to the symmetry around frame 303.

Another advantage of the configuration according to the invention shown in FIGS. 3 and 4a is the stabilization of the PPD and the wheels achieved by the arrangement of the chains. In FIG. 3, PPD transport chain 305 drives the PPDs via the frame link 307. Subframe 309 of PPD 301 mechanically bonds to frame link 307 by a threaded pin and nut. This mechanical bonding produces a connection that is more secure than might be achieved from connecting frame link 307 to the chain using a typical chain pin. The weight of PPD 301 may also be substantially less than that of the PPD transport chain 305 in order to improve stability. This can be accomplished by forming the PPD using lightweight, durable plastics and a making the PPD transport chain using comparatively large and heavy chain links.

Figure 4B:
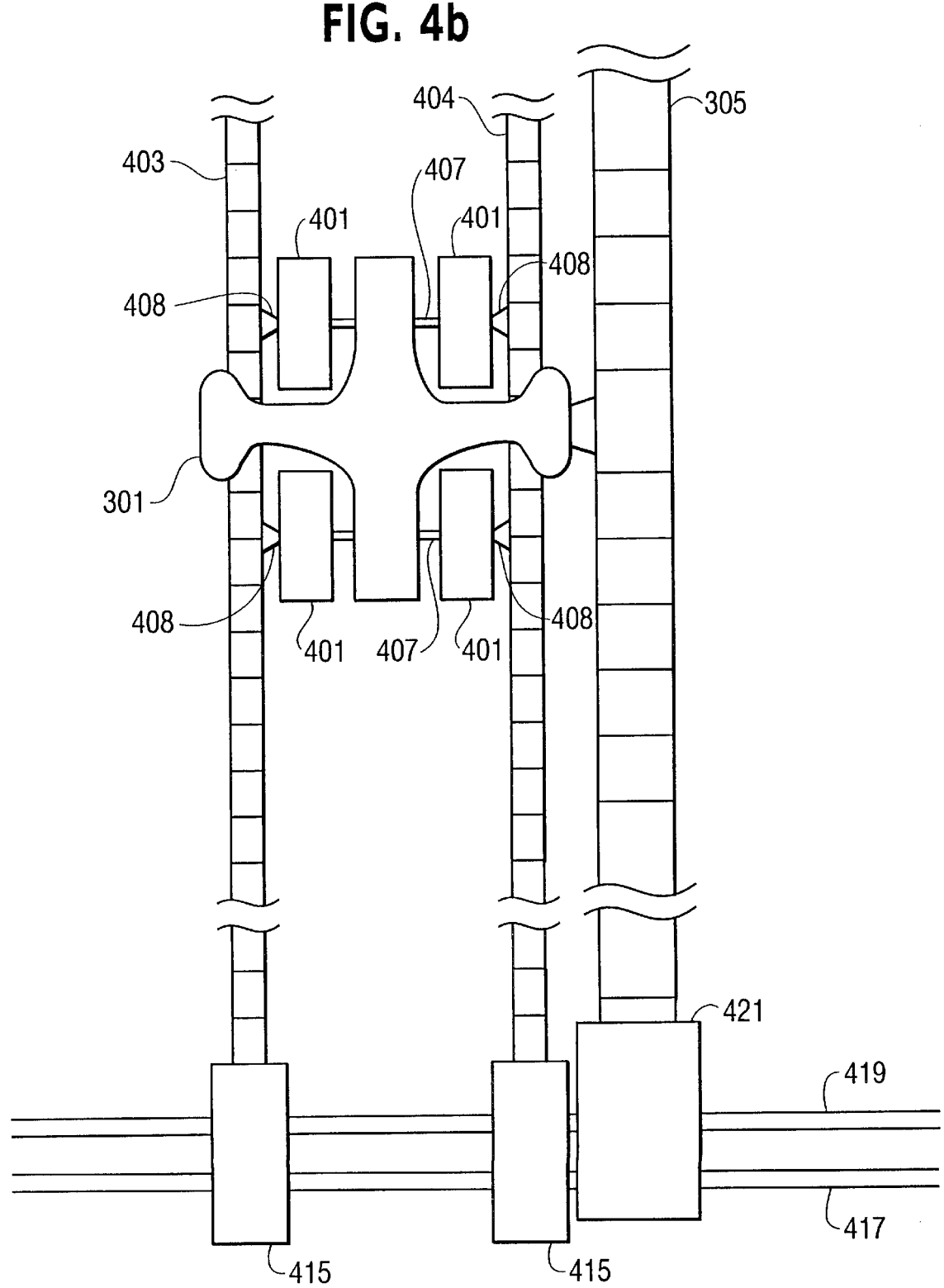
FIG. 4b illustrates the relationship between wheel axles and chain drives.
Figure 5:
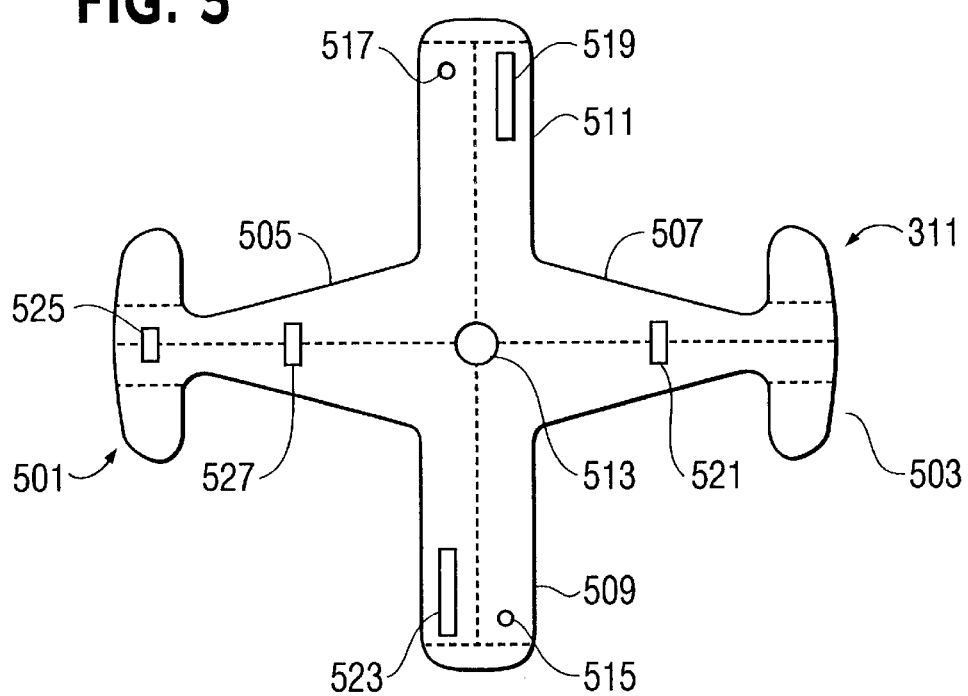
FIG. 5 is a bottom view of a floating portion of a PPD according to the invention.

FIG. 4b illustrates a further feature of the invention which enhances PPD stability relative to the wheels. Wheels 401 which marry to PPDs 301 in each lane shown in FIG. 4a have a corresponding pair of chains 403 and 404. As previously discussed, the wheels are connected to separate chain drives 403 and 404 through corresponding wheel transport links 405. Axles 407 connect the wheels. Wheel chain drives 403 and 404 are mounted to sprockets 415, as shown in the top view of FIG. 4b. Sprockets 415 are mounted on a drive axle 417. Preferably, drive axle 417 is different from drive axle 419 which mounts sprockets 421 for driving PPD transport chain 305. When mounted and turning on sprockets 415 and 417, chains 403 and 404 are in tension and along with axles 407 form a parallelogram. The parallelogram thus formed is a geometrically stable pattern which allows the relative positions of wheels 401 and PPD 301 to be established with consistency. This consistent, geometrically stable parallelogram pattern of the wheels and the PPDs facilitates marrying and divorcing the wheels from the PPDs while reducing interference that may occur between the wheels and the PPDs. A further feature of the invention that adjusts spacing between PPDs 301 and wheels 401 is a phasing device discussed further herein.

Figure is a bottom view of a floating portion 311 of a PPD according to the invention. Floating portion 311 is formed with a slight cup shape when viewed from its top to receive and hold a piece of fruit or other object to be sorted. Floating portion 311 has the general shape of a cross with an exterior extension 501 and interior extension 503 extending from arms 505 and 507 of the cross respectively. Interior and exterior extensions 501 and 503 assist in maintaining the fruit inside the PPD. The remainder of the cross is formed by front and rear arms 509 and 511. These arms receive the fruit to be sorted and are configured to place the fruit generally in the center of the floating member. The center of the cross is the deepest point of the floating member and, preferably, has a drain hole 513 therein. Preferably, each of the arms 505, 507, 509 and 511 has a center line that, when viewed from the top of the floating member 311, is deeper than the edges of the arm. Thus, when viewed in cross section, each of the arms is generally V-shaped and slopes downward from the edge toward the center of the PPD. Various curvatures may be incorporated into the arms to facilitate placement of the fruit or other object to be sorted.

Extending from the bottom of floating member 311 are generally conically shaped posts 515 and 517. Also extending from the bottom of floating member 311 are four weighing legs 519, 521, 523 and 525. The length of the legs is such that floating portion 311 will remain level when placed on a level surface. Also extending downward from the bottom of floating portion 311 is extension 527.

Figure 6:
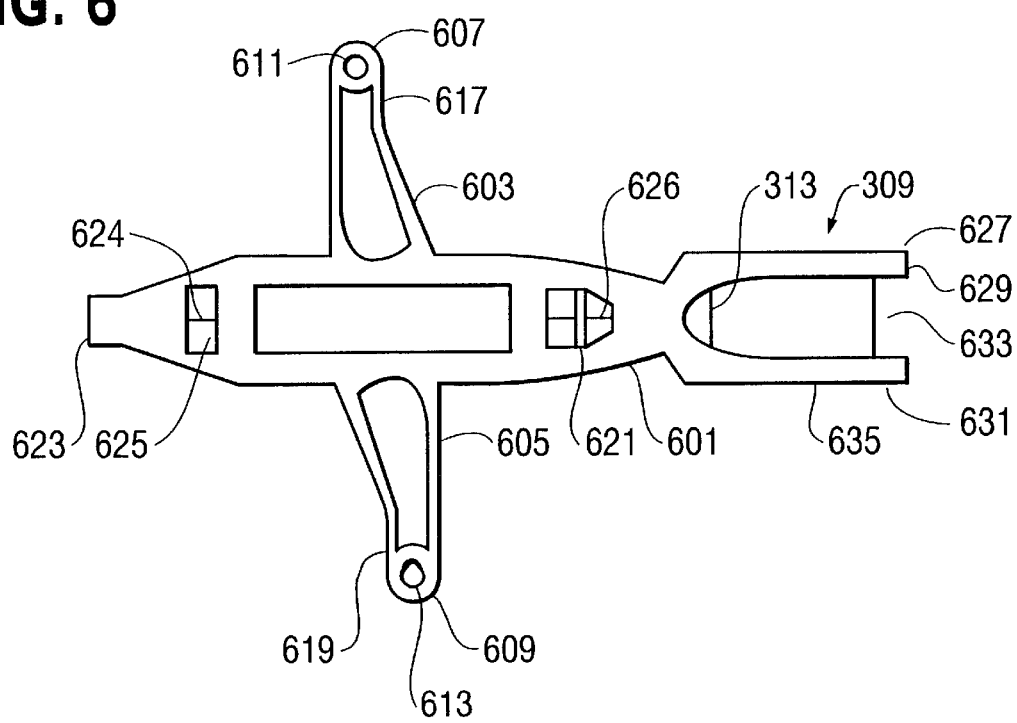
FIG. 6 is a bottom view of a subframe of a PPD according to the invention.

FIG. 6 illustrates a bottom view of the subframe 309. Subframe 309 has a body portion 601 with holes and slots to receive posts, legs, and projections extending downward from the bottom of floating portion 311. Arms 603 and 605 extend outward from the body and are tapered to terminate at end portions 607 and 609. Each end portion has a hole 611 and 613. When floating member 311 and subframe 309 are assembled into a PPD 301, a post, such as conical post 517, extends through hole 611. Similarly, a post, such as conical post 515 extends through hole 613. As a result of the taper of arms 603 and 605, weigh leg 519 protrudes past section 617 of subframe 309. The placement of a weigh leg downward past the tapered section 617 of the subframe 309 provides a degree of horizontal stability to the PPD as it travels along the conveyor. Similarly, weigh leg 523 protrudes past section 619 of subframe 609. In addition, weigh leg 521 protrudes through slot 621 of subframe 309. Weigh leg 525 protrudes past the outside portion 623 of subframe 309 and protrusion 527 protrudes through slot 625 of subframe 309. Pins 624 and 626 can be inserted into subframe 309 to pass through slots in protrusion 527 and weigh leg 521 to insure that floating member 311 is secured to the subframe. Alternatively, protrusion 527 and/or weigh leg 521 can be formed with burrs to provide a snap fit into slots 625 and 621.

Subframe 309 has a further extension which extends toward the inside of the lane toward the frame 303. Extension 627 has a pair of arms 629 and 631 with stop member such as stop pin 633 extending therebetween at an approximate end thereof. Extension 627 mounts into frame link 307 such that a latch mechanism can operate in portion 635.

As discussed further herein, a unique advantage of the PPD according to the invention occurs in weighing operations. Since posts 515 and 517 pass through corresponding holes 613 and 611, and since weigh legs 519, 523 and 525 are on the outside portions of the subframe while weigh leg 521 and guide member 527 pass through slots 621 and 625 respectively, the floating portion 311 is free to move up and down independently of the position of the subframe 309. The ability to adjust the vertical position of floating member 311 while the entire PPD including the floating member 311 and the subframe 309 is advanced by chain drive 305, allows a system according to the invention to obtain very accurate weights.

Figure 7A:
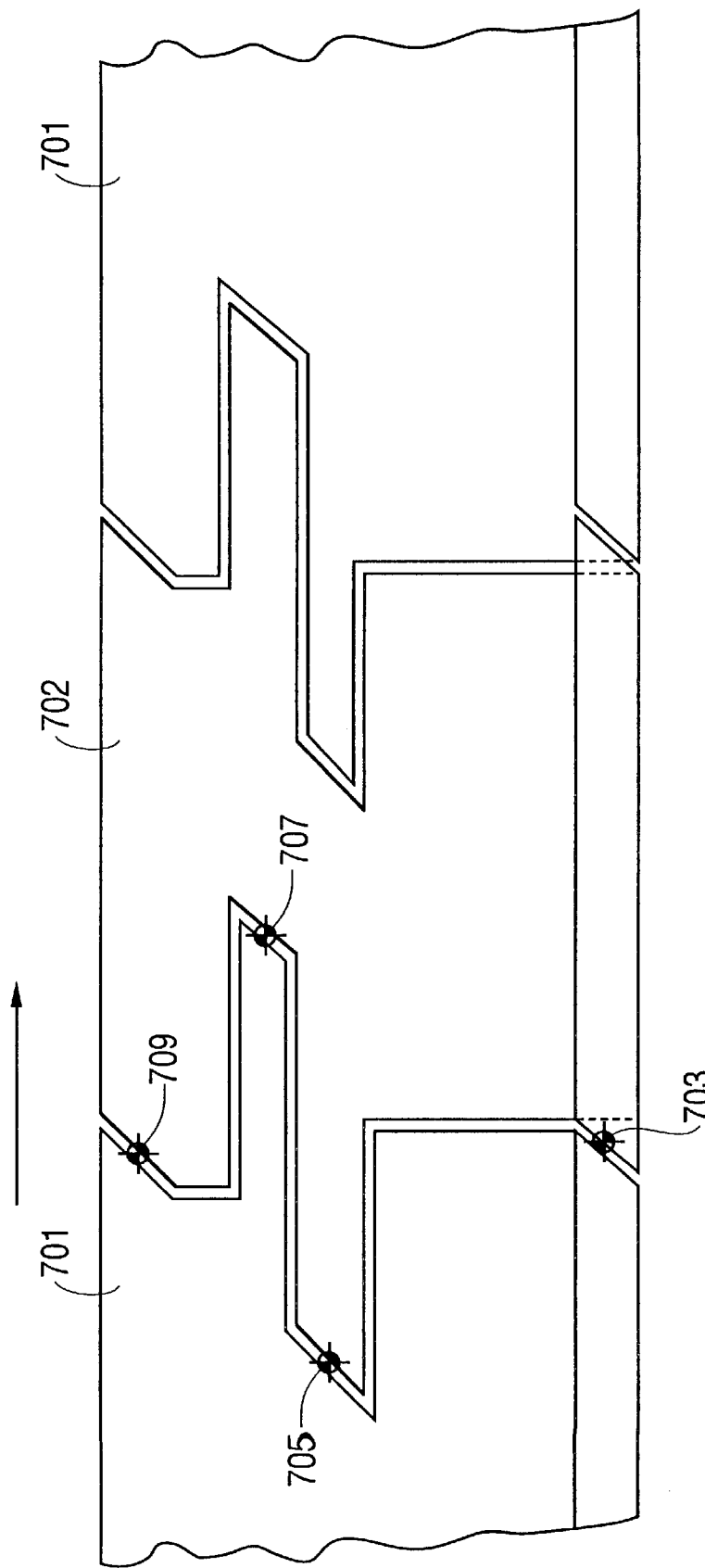
FIGS. 7a and 7b illustrates a scale layout which can advantageously be used with a PPD according to the invention.
Figure 7B:
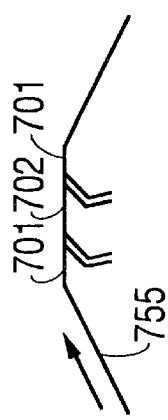

FIG. 7a shows the top surface of a scale layout that takes advantage of the position of the weighing legs of the PPD according to the invention, and FIG. 7b shows a side view of the scale layout. In accordance with the invention, a weighing scale is elevated slightly. As a PPD approaches the weighing scale 702 along a direction as shown by the arrow, weighing legs 519, 521, 523 and 525 of the floating portion 311 ascend a ramp 755 to the weighing platform 701. Since the floating portion 411 moves vertically independently of subframe 309, the weighing scale 702 detects only the weight of the floating portion 311 and the object therein. Since the weight of the floating portion 311 is constant, it can be subtracted out and an accurate weight of the object in the PPD can be determined.

A further advantage of the PPD and weighing scale according to the invention is found in the layout of the weighing legs and the weighing scale. The weighing scale is shaped such that all four legs of the PPD are in contact with the weighing element simultaneously. This is shown in FIG. 7a at points 703, 705, 707 and 709. For example, weigh scale 702 is configured such that at the time forward weigh leg 523 makes contact with point 707, inside and outside weigh legs 521 and 525 make contact with elements 703 and 709. In addition, trailing weigh leg 519 makes contact with point 705 at the same time the remaining legs contact their respective points on the scale. Scale 702 is laid out such that each weigh leg travels through the same distance on the scale. As a result, each weigh leg is on the scale simultaneously for the same amount of time. This allows the weigh scale, which may be of conventional design, to maximize the number of weight samples that can be taken.

Figure 8:
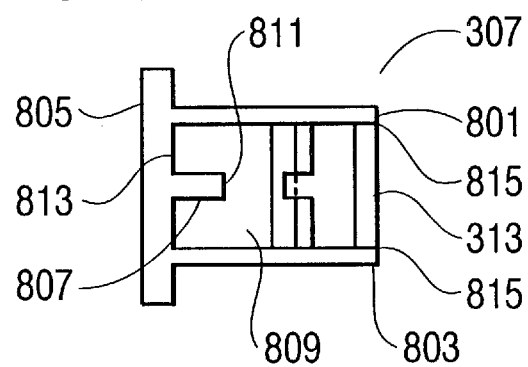
FIG. 8 is a more detailed view of a framelink.

FIG. 8 is a top view of the framelink according to the invention. As previously discussed, subframe 309 of PPD 301 has arms 629 and 631, which fit between frame members 801 and 803. Mounting portion 805 of framelink 307 is fastened to chainplate 321 to provide a link with chain 305, as shown in FIG. 3. Post 807 protrudes from mounting flange 805 into an area 809 between arms 801 and 803 of framelink 307.

Figure 9A:
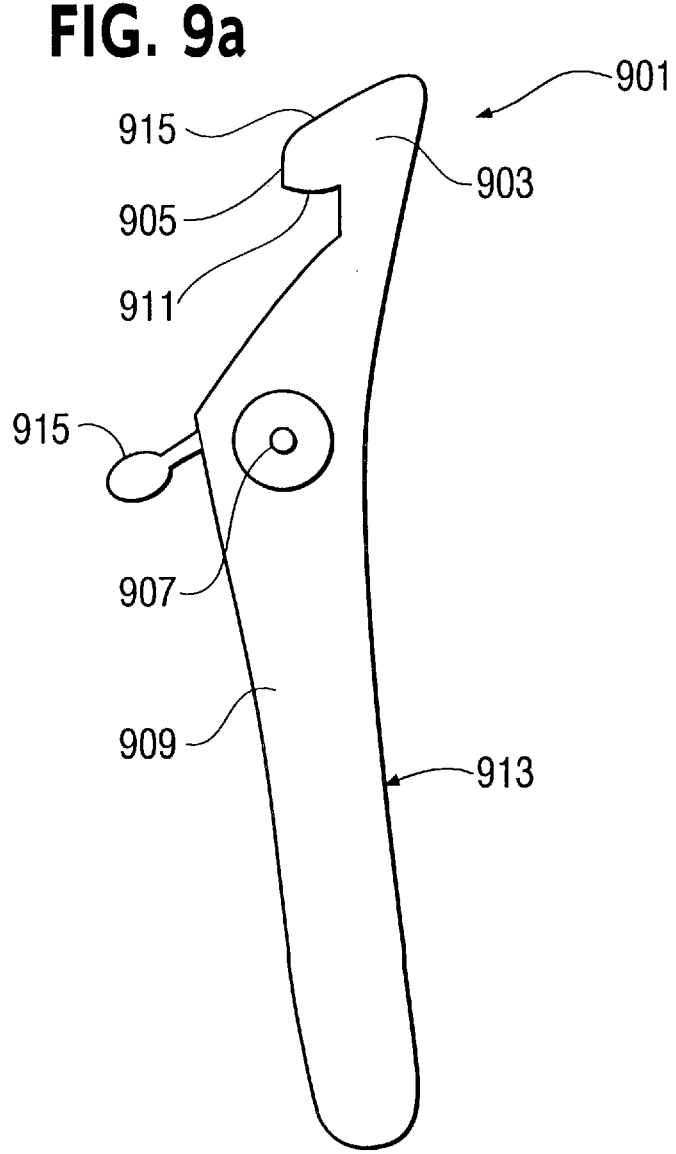
FIGS. 9a, 9b and 9c show various views of a subframe and a latch used in the latching mechanism of the invention.

A latch 901 is shown in FIG. 9a. Latch 901 has a head portion 903 with a flat end 905, a pivoting connection 907 and an elongated body 909. Through its pivoting connection 907, latch 901 mounts between arms 801 and 803 of framelink 307 such that flat end 905 makes contact with corresponding strike plate 811 of protrusion 807. A snapfit or any other suitable arrangement can be used to mount pivoting connection 907 to frame link 307. In operation, pin 633 extending between arms 629 and 631 of subframe 309 is used to establish the position of PPD 301. Advantageously, pin 633 is located close to the end of the subframe, as shown in FIG. 6. This positioning of pin 633 provides a relatively long pivoting arm which is substantially the entire length of the subframe, thereby facilitating soft depositing of fruit to a collection area through a short vertical distance.

Figure 9B:
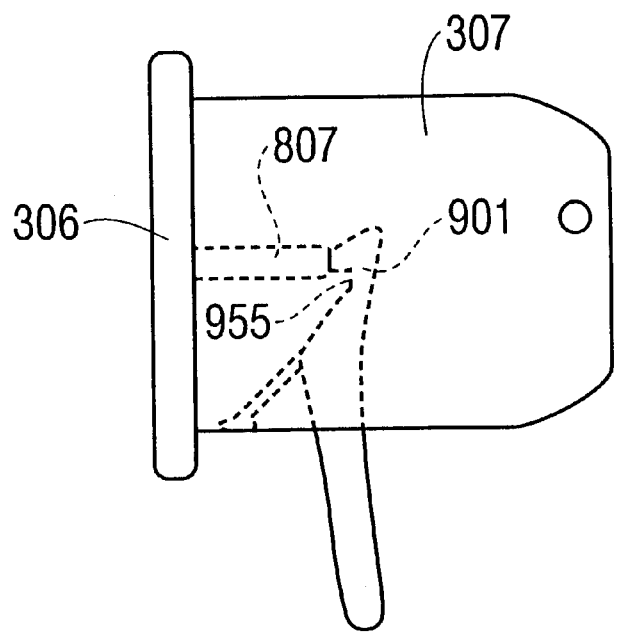
Figure 9C:
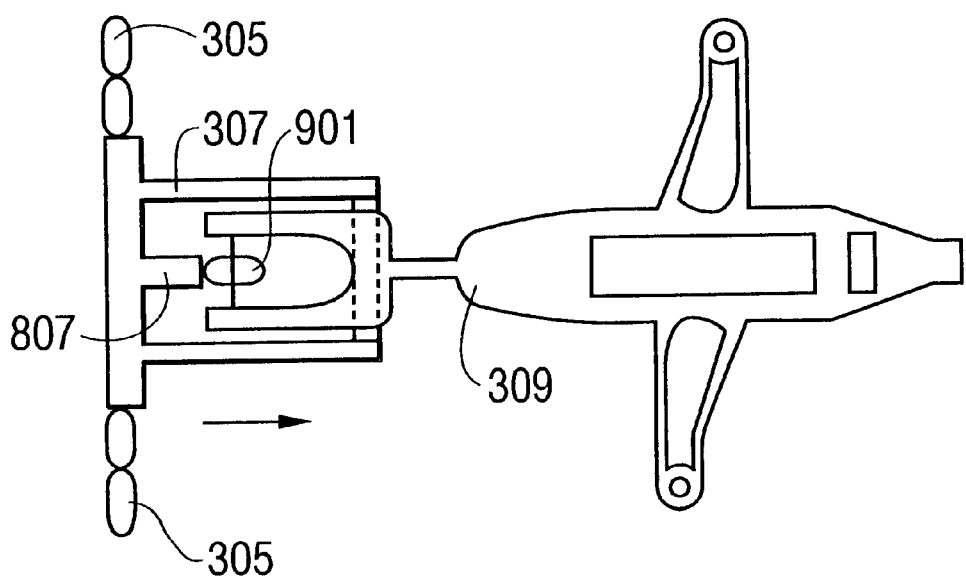

When PPD 301 is in the fruit carrying position, wherein fruit can be held in floating member 311 for viewing or weighing, pin 633 between arms 629 and 631 of subframe 309 is secured by the operation of latch 901. When flat end 905 and strikeplate 811 contact each other, subframe pin 633 is held in place by bottom portion 911 of head 903 of latch 901. In order to cause fruit to drop from the PPD into a collection bin, a solenoid controlled device exerts pressure on surface 913 of elongated portion 909 of latch 901. This causes elongated portion 909 to move toward interior surface 813 of flange 805 of frame link 307. As a result, head portion 903 moves away from interior surface 813 of flange 805 causing a gap between flat end 905 and strike plate 811. This releases the subframe pin 633, which passes through the gap, thereby allowing PPD 301 to point downward by pivoting about the pin 313 mounted through holes 815 in frame link 801. As a result, floating member 301 delivers the fruit therein to a collection bin. As will be known to those of ordinary skill, the solenoid controlled device can be activated, for example, by processor 107, to cause the fruit to be collected at any one of drop stations 119, depending on its weight, color, size or other sorting parameter. The action of spring member 915 causes latch 901 to close the gap between flat end 905 and strike plate 811 when pressure is removed from the surface 913 of elongated member 909, for example, when the latch completes its passage across a solenoid controlled drop gate, as discussed further herein. FIG. 9b shows a side view of frame link 307, which also shows the disposition of the latch 901 in its urged-closed position with respect to the post 807 of the frame link 307. Frame link 307 is connected to the chain by an element 306, as can also be seen in FIG. 3. As seen in the top view of the PPD shown in FIG. 9c, when the latch 901 is in its urged-closed position, it maintains the subframe 309 in place by holding the stop pin 633 of the subframe 307 within the region 955 of the latch 901. When the latch 901 is released by virtue of the solenoid, the latch 901 moves in the direction of the arrow shown in FIG. 9c. This releases the stop pin 633 thereby causing the stop pin 633 to slide over the top portion 915 of the latch 901. In turn, the subframe 307 (and thereby the floating member 311 resting thereon) tilts downwards in a direction shown by the arrow.

Before the PPD is returned to collect more fruit from singulator 101, it must be reset to a carrying position such that the pin is held in place by portion 911 of head 903. Resetting the PPD to the carrying position from the drop position can be accomplished by moving PPD 301 up a ramp as it advances in the system. This can be accomplished by moving the PPD up a ramp whose height exceeds the vertical travel of the floating member 311, thereby causing upward pressure on the subframe 309. The upward motion on the ramp causes pin 633 to slide along top portion 915 of head 903 in a direction toward the interior portion 813 of flange 805. At some point the pin will be forced between strike plate 811 and flat end 905, thereby causing pin 633 to be held in place by flat portion 911 of head 903 until the latch is again opened by a solenoid device exerting pressure on face 913 of elongated portion 909.

Still another advantage of the invention is found in the solenoid and drop gate configuration. When operated by the solenoid, the drop gate exerts pressure on face 913 of elongated portion 909 in order to open and close latch 901. The solenoid has a protective cover on it to prevent damage from moisture. The solenoid and drop gate operate in unison, such that if the solenoid fails to operate properly, there is no damage to other components of the system, such as the PPD. The solenoid and drop gate are also configured for ease of maintenance.

Figure 10A:
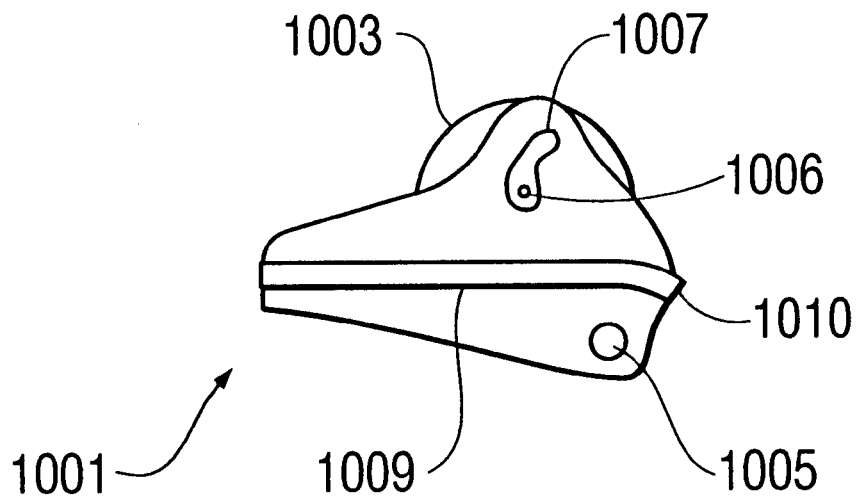
FIG. 10a illustrates a top view of drop gate used in the invention.
Figure 10B:
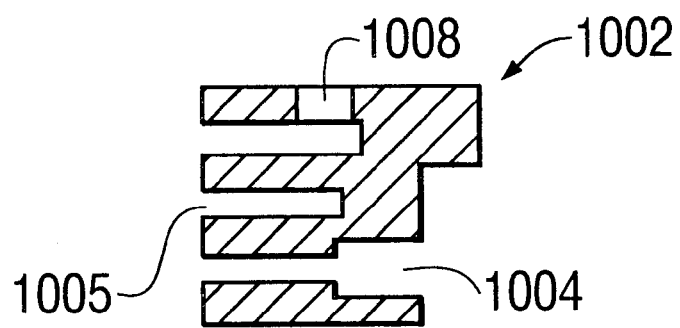
FIG. 10b is a side view of a mounting member according to the invention.

FIG. 10a is a top view of the drop gate 1001 according the invention when mounted on a solenoid 1003. The solenoid and drop gate are both attached to a mounting member 1002 which can be positioned anywhere on frame 303 to accommodate the location of the drop stations. A side view of the mounting member is shown in FIG. 10b. FIG. 10b shows that mounting member 1002 has a slotted design which allows it to be mounted to a flange 323 on the lower portion of frame 301. Slot 1005 can be fit onto flange 323 at any desired location. Thus, the assembly with the solenoid and drop gate can be positioned anywhere and can be moved easily by loosening a fastening member which fits in hole 1004 and sliding the assembly with the solenoid and drop gate to a new location.

The solenoid and drop gate 1001 are placed on the top of the mounting member 1002. This allows the moveable control pin 1006 of solenoid 1003 to mate with hole 1007 of the drop gate, as discussed further herein. Preferably, the solenoid is fastened from the bottom to the mounting member, for example through hole 1008 in mounting member 1002, and can be replaced by removing the mounting member from the frame and removing the solenoid. The drop gate 1001 is preferably fastened from the top of the mounting member for easy replacement.

Drop gate 1001 has a generally L-shaped opening 1007. Moveable pin member 1006, whose position is under control of the solenoid, protrudes through the hole 1007 to control the position of the drop gate 1001. The hole 1007 is shaped to cause strike member 1009 of the drop gate not to contact the latch 901 in the normal position. In this position, the PPD passes by the drop gate without making contact and retains the fruit in the floating member 311. When activated by a command, such as a voltage, the solenoid control pin 1006 moves to another position. Its protrusion through the hole 1007 exerts force causing the drop gate to move to a position where strike member 1009 contacts surface 913 of elongated portion 909 of latch 901, as a PPD and latch carried by a frame link pass by the drop gate. In this position, the pressure from strike member 1009 on elongated portion 913 overcomes the force of spring member 915. As a result, flat end 905 separates from the strike plate 811, thereby allowing the latch to release pin 633, so that PPD 301 drops the fruit in floating member 311 for collection. After advancing past the drop gate, spring member 915 of latch 901 making contact with surface 813 of frame link 307 drives flat end 905 and strike plate 811 back together, thereby closing the gap.

Figure 10C:
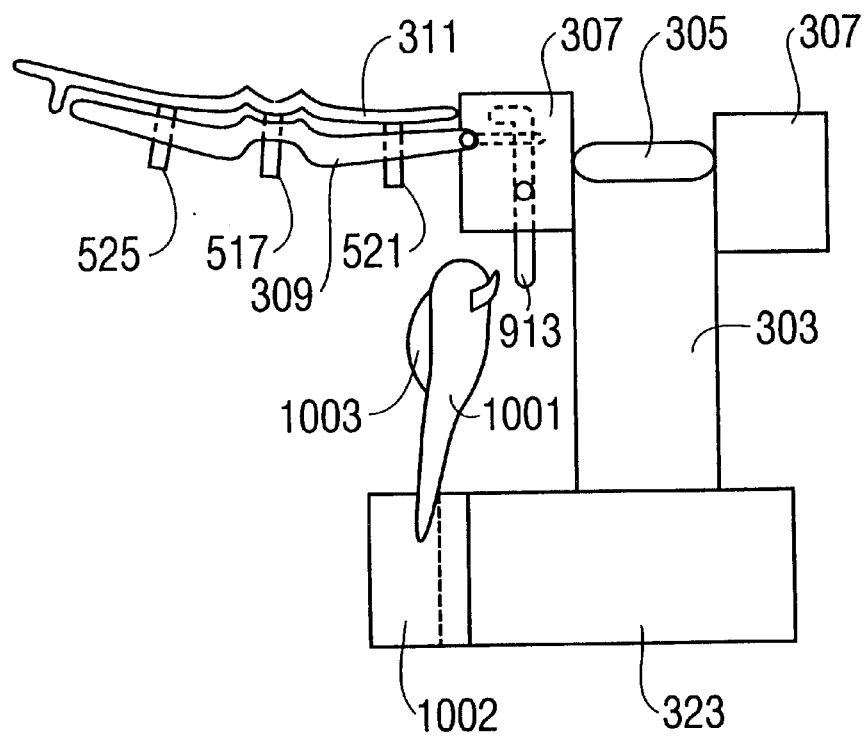
FIG. 10c is a front-on view of the object sorter and sizer according to the invention, showing the relationship of the drop gate, solenoid and latch.
Figure 10D:
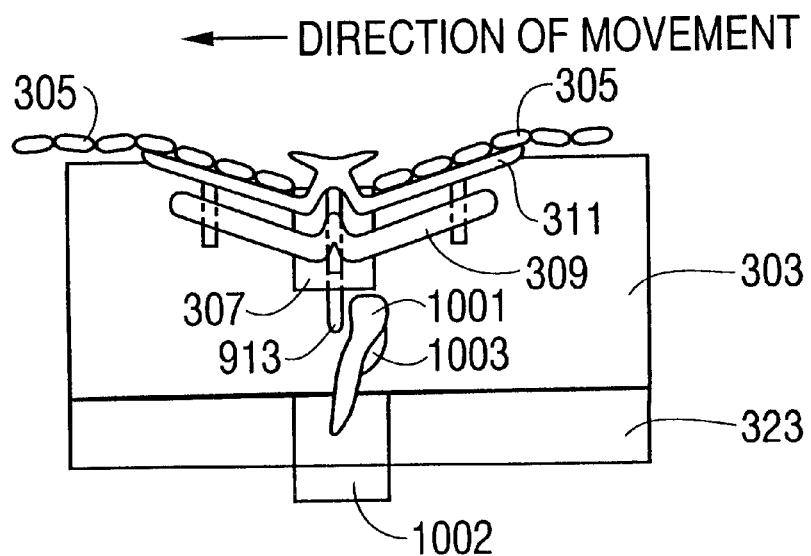
FIG. 10d is a side view of the object sorter and sizer according to the invention, showing the relationship of the drop gate, solenoid and latch from a different view.

FIG. 10c is a front-on view of the object sorter and sizer according to the invention, showing the relationship of the drop gate 1001, solenoid 1003 and latch 913, as well as the connectivity of the PPD to the frame 303. In FIG. 10c, the direction of movement of the PPD is into the page. FIG. 10d is a side view of the object sorter and sizer according to the invention, showing the relationship of the drop gate 1001, solenoid 1003 and latch 913 from a different view. In FIG. 10d, the direction of movement of the PPD is shown by the arrow in that figure.

According to the invention, drop gate 1001 and latch 901 are configured so that a failure of a solenoid does not cause damage to the latch or PPD 301. In case of solenoid failure, its internal spring action causes the control pin 1006 to rest in a disengaged position where the drop gate 1001 is positioned not to engage latch 901. Thus, the latch passes harmlessly by the failed solenoid. To further assure PPDs or latches are not damaged, the strike member 1009 of the drop gate 1001 has a slight curvature shown at 1010. A latch 901 approaching a drop gate which is slightly open, but is not operational, gradually transitions onto the drop gate across this curvature, thereby urging the drop gate further away from the path of the latch and PPD. As a result, there is little chance of damage to the latch or the PPD as a result of solenoid failure.

As previously noted, one feature of the invention is the ability to marry and divorce wheels from PPD 301. The fact that wheels can be divorced from the PPD facilitates the placement of fruit or other objects into collection bins without damage. For example, conventional systems where wheels are employed require that the fruit be lifted above the level of the wheel in order to be dropped into a collection bin. Essentially this means that the fruit must catapult over and above the height of the wheels, thereby risking damage to the fruit. Other systems which drop the fruit from conventional carrier cups have no means for gently allowing the fruit to exit the cup. In such systems the carrier cup tilts and the fruit simply drops out. In the present invention, the shape of floating member 311 and the absence of the need to overcome the height of wheels, which block the fruit, allows fruit to be gently deposited into an appropriate collection bin without risking damage to the fruit. In addition, as previously noted, the position of pin 633 near the end of subframe 309 provides for a relatively long cushioned drop out of the floating member 311 of PPD 301, thereby minimizing the free distance fruit must travel when being deposited at a drop station. This further reduces the likelihood that fruit will become damaged.

Figure 11:
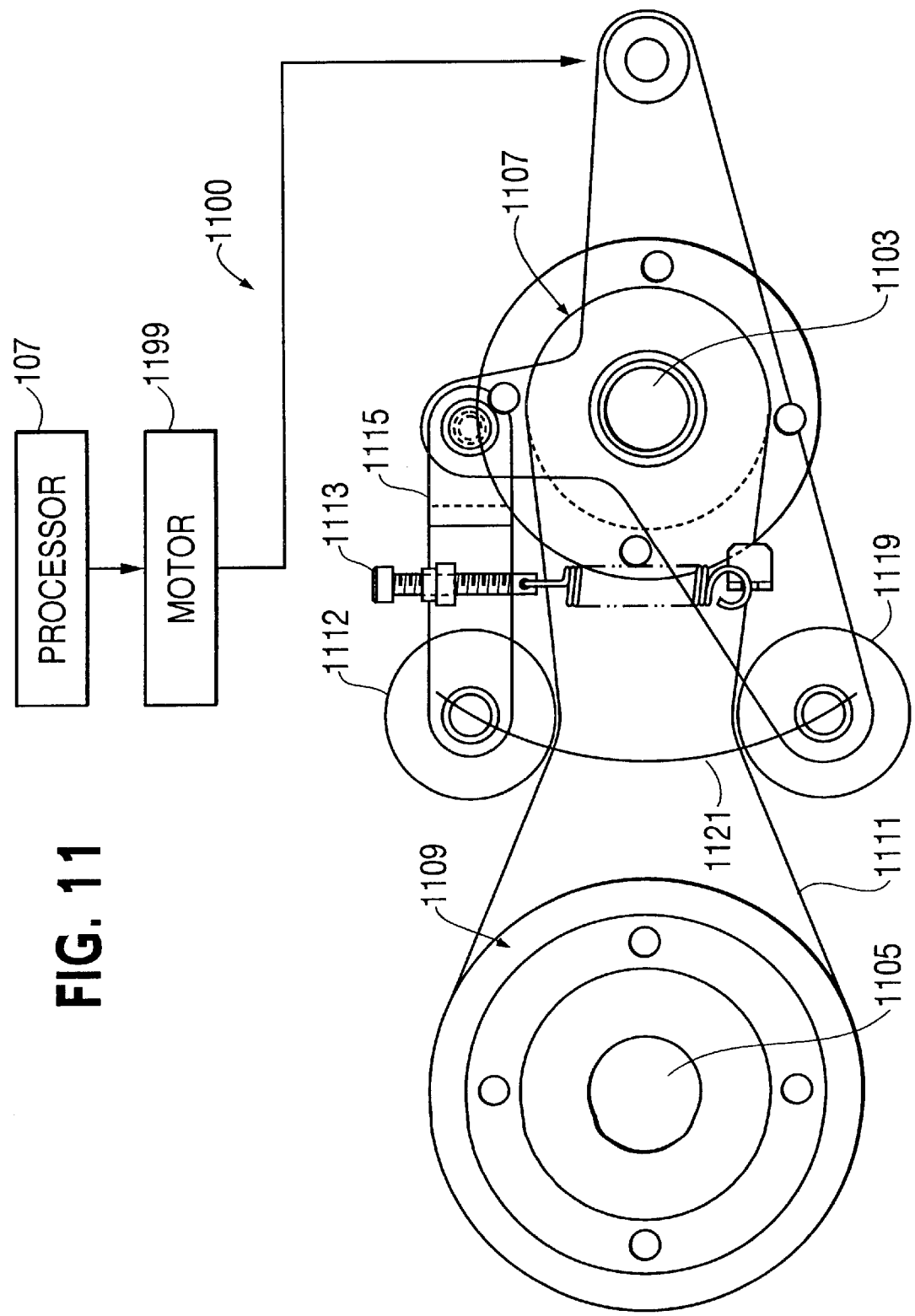
FIG. 11 shows a chain phasing device according to the invention.

Another feature of the invention is a chain phasing device used to maintain spacing between wheels 401 and PPDs 301. It may be desirable to adjust the position of the wheels relative to the PPDs in order to prevent frictional contact between these devices, which would result in undue wear and tear on the PPD or the wheel. Thus, the chain phasing device of the invention extends the life of the product while it reduces the need for replacing parts and lowers the need for maintenance. Chain phasing device 1100, according to the invention, is shown in FIG. 11. Chain phasing device 1100 differs from a conventional chain drive by its incorporation of a tensioning mechanism. As with conventional chain drives, chain phasing device 1100 has a pair of sprockets 1103 and 1105 on fixed centers and timing pulleys 1107 and 1109. Drive belt 1111 is connected between the timing pulleys to drive wheel chain 403 in a conventional manner. According to the invention, a sensor, such as a photo sensor 409, is mounted in the system to monitor the spacing 411 between the wheels 401 and PPD 301. Photosensor 409 may send spacing information to processor 107 which in response sends a signal to tensioning device 1113. Alternatively, photosensor 409 could send its own signal directly to tensioning device 1113. In one embodiment according to the invention, tensioning device 1113 is mounted to a plate 1115. The tensioning device 1113 controls the position of wheels 1117 and 1119 which contact belt 1111, thereby imparting tension to the belt. Wheels 1117 and 1119 move generally along an arc illustrated by line 1121, although other degrees of motion, such as linear motion could be used. The net result is to adjust the timing belt so that the desired spacing 411 between wheel 401 and PPD 301 is maintained. The tensioning device 1113 can be driven by a DC motor such as motor 1199 in FIG. 11, responsive to the signal from the photodetector.

Referring again to FIGS. 4a and 4b, the present invention uses a dual chain parallelogram configuration for chains 403 and 404 to drive the wheels 401, as previously discussed. A separate chain 305 drives PPDs 301. The dual chain parallelogram configuration according to the invention improves performance over conventional systems which cantilever off of one chain. Further improvement is achieved by the chain phasing approach. These approaches can be combined or used separately to provide a highly reliable and stable system with less wear and tear on critical components, reduced need for maintenance and greater component longevity.

The system according to the invention provides numerous improvements over conventional systems and allows accurate and rapid sorting and sizing of fruit or other objects. The PPD, frame link, latch and pivoting members may be formed out of any material suitable for the sorting application. In many applications, lightweight and durable plastic materials may be used to form such devices.

The elements described herein can be used individually or in combination and each element can be employed in a method for sorting objects. For example, a method according to the invention includes moving a two part product presentation device (PPD) horizontally through a system wherein a first part of the PPD moves vertically independent of the horizontal motion of the first and second parts. The method may also include linking the PPD to a conveyor through a frame link.

A method according to the invention may also include linking PPDs to the conveyor on opposite sides of a frame on which a transport device, such as a chain travels. A method according to the invention may further include marrying another carrier with the PPD. Another method according to the invention includes maintaining stability of the PPD and the carrier by driving opposite sides of the carrier with separate transport drives and linking the carriers by axles. Another method according to the invention includes adjusting spacing between carriers and PPDs by adjusting the position of the transport chains. For example, a method according to the invention could use a phasing device responsive to a photodetector, as disclosed herein.

A method according to the invention can also employ a scale as disclosed herein to perform weighing operations. A method of the invention can also use a latch, solenoid and drop gate as disclosed herein to deposit objects as desired.

A method of pre-singulating objects according to the invention includes using frictional force to advance objects into channels when the objects may accumulate. Such a method can be accomplished by placing the objects on tube encased rotating rollers. When the objects contact the tubes they transfer weight to the rollers, thereby causing the objects to advance. Such a method can be implemented using a pre-singulator with rollers as disclosed herein.

Another method of pre-singulating objects according to the invention includes placing objects on moving belts along walls of a V-shaped channel, for example, using an apparatus as disclosed herein.

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A product presentation device comprising:
   a subframe;
   a floating portion engaging said subframe to move in a horizontal direction with movement of said subframe, said floating portion being moveable in a vertical direction independently of horizontal movement of said subframe.

2. A product presentation device as recited in claim 1, said floating portion having at least two protrusions extending from a bottom portion thereof, said protrusions engaging said subframe and imparting horizontal stability to said product presentation device when engaged with said subframe.

3. An object sorting system comprising a product presentation device as recited in claim 1.

4. A product presentation device as recited in claim 1, wherein the floating portion engages the subframe for horizontal movement of the floating portion by virtue of the subframe being attached to a conveyor mechanism, and
   wherein the floating portion is configured to move vertically independently of the subframe.

5. A product presentation device as recited in claim 1, said floating portion having extensions generally shaped in a cross.

6. A product presentation device as recited in claim 5, said cross being formed of a plurality of members sloping to form a deepest point of said floating member at a center area thereof.

7. A product presentation device as recited in claim 1, said subframe comprising a pivoting connection and a stop connection, said pivoting connection being positioned to tilt to drop an object from said floating portion upon release of a stop member positioned in said stop connection at a proximate end of said subframe.

8. A product presentation device as recited in claim 7, said floating member having sloping members, extending over said pivoting connection toward said stop connection.

9. A product presentation device as recited in claim 8, said subframe forming a pivoting arm upon release of said stop connection, said pivoting arm being substantially an entire length of said subframe.

10. An object sorting system comprising a product presentation device as recited in claim 1, a conveyor and a scale, said product presentation device being moveable horizontally by said conveyor, said floating member of said product presentation device being conveyed across a weighing surface of said scale while vertically elevated from said subframe.

11. An object sorting system as recited in claim 6, said floating member having a plurality of protrusions extending downward from a bottom side thereof past said subframe, said protrusions making contact with said weighing surface for about the same amount of time.

12. An object sorting system as recited in claim 11, each of said protrusions entering and exiting said weighing surface substantially simultaneously.

13. A product presentation device as recited in claim 1, said subframe comprising a body portion having an arm extending outwardly therefrom said arm having a hole in an end portion thereof.

14. A product presentation device as recited in claim 13, said floating portion having a post extending from a bottom side thereof, said post engaging said hole and adapted to be movable in a direction vertically therein.

15. A product presentation device as recited in claim 14, said arm extending outwardly from said body being tapered to said end portion having said hole.

16. A product presentation device as recited in claim 15, said floating portion having a leg protruding from a bottom side thereof downward beyond a top edge of said tapered portion.

17. A product presentation device as recited in claim 7, wherein said hole is positioned entirely within an interior of said arm to thereby form a circular hole in said arm.

18. A product presentation device as recited in claim 1, said subframe comprising an arm having a slot therein, said floating portion comprising a member protruding from a bottom of said floating portion through said slot in said subframe to thereby engage said subframe.

19. A product presentation device as recited in claim 18, engagement of said floating portion and said subframe restricting a distance through which said floating member may move in a vertical direction.

20. A product presentation device as recited in claim 19, said subframe comprising a body portion with said slot therein.

21. A product presentation device as recited in claim 18, wherein said member comprises a post disposed to protrude through said slot in said subframe, said subframe being disposed beneath said floating portion.

22. A product presentation device as recited in claim 21, wherein said post protrudes in a substantially straight downward direction to thereby protrude through said slot in said subframe.

23. An object sorting system comprising a product presentation device as recited in claim 1, and further comprising:
a drop control device;
a frame link pivotally connected to said subframe;
a drop gate adapted to release said subframe to pivot downward in response to a control command from said drop control device.

24. An object sorting system as recited in claim 23, wherein said drop control device comprises a solenoid.

25. A product presentation device as recited in claim 23, further comprising:
a driving path for movement of said subframe from an object insertion location to an object inspection location,
wherein said driving path includes a ramp by which said subframe and said floating portion travel thereon after said subframe has been released, said subframe being urged back into a substantially horizontal position by a distal end of said subframe and floating portion pushing against said ramp to thereby exert an upwards force on said subframe and said floating portion.

26. An object sorting system as recited in claim 23, said drop gate having a pivot point about which said drop gate pivots from a hold position to strike a latch, motion of said latch releasing a pin holding said subframe in the substantially horizontal position, the pin being disposed on a proximate end of said subframe.

27. An object sorting system as recited in claim 26, further comprising resetting means for resetting said drop gate to said hold position after striking said latch.

28. An object sorting system as recited in claim 27, wherein said resetting means comprises means for urging said subframe in a direction to drive said pin to a position to be secured by said latch.

29. An object sorting system as recited in claim 27, wherein said resetting means urges said subframe toward said substantially horizontal position.

30. A product presentation device as recited in claim 1, said subframe and said floating portion having members forming openings for a carrier to marry with said product presentation device.

31. An object sorting system comprising a product presentation device as recited in claim 30.

32. An object sorting system as recited in claim 31, comprising a frame link, said frame link being connected to said product presentation device and to a transport chain to thereby move said product presentation device through said object sorting system.

33. An object sorting system as recited in claim 32, said frame link being connected to said subframe of said product presentation device.

34. An object sorting system as recited in claim 32, said carrier comprising a wheel, a plurality of said wheels marrying with said product presentation device at a location in said system.

35. An object sorting system as recited in claim 34, said wheels extending sufficiently into said product presentation device to lift an object therein off a floor of said floating portion.

36. An object sorting system as recited in claim 35, said wheels being rotatable at speeds to cause an object lifted off said floor to rotate thereby presenting different portions of itself for viewing from a fixed position relative to said product presentation device.

37. An object sorting system as recited in claim 36, comprising belts contacting said wheels from below, thereby rotating said wheels at a speed to cause said rotation of said object.

38. An object sorting system as recited in claim 14, said wheels marrying with said product presentation device on opposite sides thereof.

39. An object sorting system as recited in claim 38, said wheels on opposite sides of said product presentation device being driven by separate wheel transport chains.

40. An object sorting system as recited in claim 39, pairs of said wheels on opposite sides of said product presentation device being linked to each other by an axle.

41. An object sorting system as recited in claim 40, said wheel drives being under tension such that said wheel transport chains and axles linking said wheels substantially form a parallelogram imparting stability to said system.

42. An object sorting system as recited in claim 31, comprising a phasing device, said phasing device maintaining a spacing between said carrier and said product presentation device.

43. An object sorting system as recited in claim 42, further comprising a processor, said phasing device comprising a processor-controlled adjustable tensioner, said tensioner adjusting tension on one of a transport chain moving said product presentation device and a transport chain moving said carriers under control of said processor.

44. An object sorting system as recited in claim 43, comprising a sprocket, a timing pulley and a timing belt, said phasing device changing a position of said timing belt.

45. An object sorting system as recited in claim 44, said phasing device comprising:
a second sprocket;
a second timing pulley disposed to rotate on said second sprocket; and
first and second wheels, said timing belt turning thereon, and a controller adjusting a position of said first and second wheels, thereby adjusting said timing belt.

46. An object sorting system as recited in claim 45, said position of said wheel being set by a motorized drive.

47. An object sorting system as recited in claim 45, further comprising a measuring unit for measuring a distance between said carrier and said product presentation device and for providing a signal indicative of said measured distance to said controller, said controller being responsive to said signal.

48. An object sorting system as recited in claim 47, wherein said measuring unit comprises a photodetector, said photodetector producing said signal indicative of said measured distance.

49. An object sorting system as recited in claim 48, said signal controlling a motorized drive for moving said wheel.

50. A product presentation device comprising:
a subframe; and
a floating portion engaging said subframe to move in a horizontal direction with movement of said subframe, said floating member being moveable in only a vertical direction independently of said subframe.

51. A product presentation device comprising:
a subframe; and
a floating portion engaging said subframe to move in a horizontal direction with movement of said subframe, said floating member being moveable in a vertical direction independently of said subframe,
wherein said subframe is disposed directly below said floating portion so as to support said floating portion.

52. An object sorting system, comprising:
an object depositing region for depositing an object onto a product presentation device while the product presentation device is in a substantially horizontal position, the product presentation device including a subframe and a floating portion, wherein the object is deposited onto the floating portion and wherein the floating portion rests on the subframe, the floating portion including posts that extend downward through and beneath slots provided in the subframe;

a drive coupled to the product presentation device for moving the product presentation device along a path from the object depositing region, an object weighing region, an object sorting region, a product presentation device resetting region, and back to the object depositing region, the drive being coupled to the subframe;

the object weighing region for weighing the object deposited onto the product presentation device, including a first ramped region for moving the product presentation device in an upwards direction such that the floating portion floats above the subframe as posts of said subframe contact a surface of the first ramped region;

the object sorting region for sorting the object into one of a plurality of bins based in part on the weight of the object as determined from the object weighing region, the object being sorted by tilting the subframe and the floating portion at a prescribed time so that the object drops out of the floating portion and into the one of the plurality of bins; and the product presentation device resetting region for resetting the subframe and the floating portion back to the substantially horizontal position, wherein the product presentation device resetting region includes a second ramped region for urging the product presentation device in an upwards direction from its tilted position.

* * * * *